United States Patent
Kelly

(10) Patent No.: US 11,858,579 B2
(45) Date of Patent: Jan. 2, 2024

(54) BICYCLE MIRROR

(71) Applicant: Michael John Kelly, Ottawa (CA)

(72) Inventor: Michael John Kelly, Ottawa (CA)

( * ) Notice: Subject to any disclaimer, the term of this patent is extended or adjusted under 35 U.S.C. 154(b) by 72 days.

(21) Appl. No.: 17/517,631

(22) Filed: Nov. 2, 2021

(65) Prior Publication Data

US 2022/0135164 A1 May 5, 2022

Related U.S. Application Data

(60) Provisional application No. 63/109,321, filed on Nov. 3, 2020.

(51) Int. Cl.
*B62J 29/00* (2006.01)
*G02B 7/182* (2021.01)

(52) U.S. Cl.
CPC .............. *B62J 29/00* (2013.01); *G02B 7/182* (2013.01)

(58) Field of Classification Search
CPC ............ G02B 5/08; G02B 7/182; B62J 29/00
USPC .................................. 359/842, 872, 879, 880
See application file for complete search history.

(56) References Cited

U.S. PATENT DOCUMENTS

| | | | | |
|---|---|---|---|---|
| 3,423,150 A * | 1/1969 | Freed | ......................... | G02C 9/02 2/DIG. 8 |
| 3,609,015 A * | 9/1971 | Messinger | ............. | A45D 42/00 403/138 |
| 4,349,246 A * | 9/1982 | Binner | ..................... | G02C 9/04 351/50 |
| 4,647,165 A * | 3/1987 | Lewis | ..................... | G02C 9/02 351/59 |
| 4,798,454 A * | 1/1989 | Hyun | ........................ | G02C 9/02 351/158 |
| 4,934,806 A * | 6/1990 | Berke | ...................... | G02C 7/14 351/50 |
| 5,076,701 A | 12/1991 | Greenlaw | | |
| 6,007,198 A * | 12/1999 | Burton | ..................... | G02C 7/14 351/41 |
| 6,052,832 A * | 4/2000 | Crompton | ............ | A42B 3/0426 2/DIG. 8 |
| 6,065,832 A * | 5/2000 | Fuziak | ...................... | G02C 7/14 351/50 |
| 6,247,824 B1 * | 6/2001 | Berke | ............... | G02B 27/0176 2/209.14 |
| 6,595,635 B2 * | 7/2003 | Schubert | ................ | G02B 7/002 24/3.12 |
| 8,156,575 B2 | 4/2012 | Tronvig | | |
| 9,723,886 B2 | 8/2017 | Burse | | |

(Continued)

*Primary Examiner* — Ricky D Shafer
(74) *Attorney, Agent, or Firm* — Stephen J. Scribner

(57) ABSTRACT

A bicycle mirror device is provided for rear viewing of traffic when a bicycle rider is in different riding positions. The bicycle mirror device includes a mounting bracket, attached to a bicycle helmet or eye glasses, and mirrors pivotally mounted to the mounting arms. The mounting arms may be attached to the helmet or eye glasses through an extension arm connected to the helmet or eye glasses through a quick-connect system. A method for using the bicycle mirror device includes mounting the mirror device on a helmet or eye glasses, rotating a first mirror to view a first rear-view angle for a cyclist in a low riding position, rotating a second mirror to view a second rear-view angle for the cyclist in an upright riding position, and viewing a plurality of rear view angles without readjusting the first or second mirror.

8 Claims, 3 Drawing Sheets

(56) References Cited

U.S. PATENT DOCUMENTS

| | | | |
|---|---|---|---|
| 2006/0026741 A1* | 2/2006 | Lang-Ree | A42B 3/04 |
| | | | 2/209.14 |
| 2007/0091480 A1 | 4/2007 | Varnes | |
| 2018/0168266 A1* | 6/2018 | Windover | A42B 3/0426 |

* cited by examiner

BICYCLE MIRROR

FIELD

The present disclosure relates to a device and method for bicycle safety. More specifically, the disclosure relates to a device and method of use for a bicycle rear view mirror.

BACKGROUND

Bicycling is a relatively inexpensive way to enjoy the great outdoors and reduce one's carbon footprint, all while benefiting one's health. Unfortunately, cyclists must often share the road with much larger, faster moving vehicles. As there are more and more vehicles on the road and the additional increasing problem of distracted driving, cyclists face the danger of not seeing vehicles coming from behind.

Bicycle fatalities in the U.S. reached 857 deaths in 2018. The majority of these fatalities are a result of poor vehicle driver attention and/or a cyclist unaware of their surroundings. It is known that one of the most important safety aspects for a cyclist is knowing what is coming up from behind them and bicycle mirrors can help achieve that. Unfortunately, despite the wide array of bicycle mirrors on the market, they all have weaknesses. Specifically, they typically fail when it comes to allowing the rider to view rear approaching vehicles when the cyclist moves from a low aerodynamic position, to a more upright position—unless the rider readjusts the mirror. Possible positions on the bike range from the lowest aerodynamic position in the saddle, to a fully standing position out of the saddle. Changing from those positions would require a rider using a traditional bike mirror to make dangerous adjustments to the mirror while riding or, worse, have them make dangerous movements of their head to try to get a glimpse of what is behind them. It is dangerous to try and adjust a bicycle mirror while the bicycle is in motion.

Unfortunately, there exists a myriad of potential dangers to both the recreational and more athletic cyclist, such as intoxicated or distracted vehicle drivers and road obstacles, etc. From a defensive perspective, cyclists need to concentrate to ride in a predictable manner and avoid loss of balance or steering the bike into a hazard. Trying to adjust a bicycle mirror while riding, as required with traditional mirrors, negatively affects a cyclist's ability to concentrate, making the cyclist vulnerable to potential dangers. In order to maintain safety while riding a bicycle, the rider needs to have both hands on their bicycle and their eyes positioned in a forward direction to watch for oncoming traffic, road damage or obstacles in front of them. Additionally, awareness for rear approaching vehicles is also of paramount importance.

Without any type of bicycle mirror, the rider can remain oblivious to rear approaching vehicles and thus not be prepared to take evasive action to avoid a possible accident. That said, it is not feasible to frequently turn one's head to view rear approaching vehicles, as the rider's negatively affected balance and resultant steering could also cause an accident. However, it is also very dangerous to adjust a traditional bicycle mirror while in the process of riding, as this requires removing one hand from the bicycle handlebars and extra focus to make the mirror adjustment. As a result, many cyclists simply avoid using traditional bicycle mirrors altogether or worse, those who attempt mirror adjustments of existing bicycle mirrors while riding, are much more likely to be involved in an accident.

The use of rear-view mirrors for bicycle helmets is known in the prior art. Examples of such known devices of this type are those shown in U.S. Pat. No. 5,076,701 to Greenlaw; U.S. Pat. No. 9,723,886 B2 to Burse; U.S. Pat, No. 8,156,575 to Tronvig; and U.S. Pat. Application 20070091480 to Varnes.

U.S. Pat. No. 5,076,701 to Greenlaw references a rearview mirror for securement to a protective headgear. Included is an extension bar having a holder for a reflective rear view mirror mounted on one end and an adjustable connection positioned between the extension bar and the mirror holder section itself. The opposite end of the extension bar includes a flat blade shape structure that can be secured to the headgear with adhesives.

U.S. Pat. No. 9,723,886 B2 to Burse references an integrated single mirror that removably clamps onto the rider's helmet—the bracket is adapted to be wedged under the front rim of the helmet. Given the vast array of helmet sizes on the market, there is no way of knowing if the bracket could have difficulty wedging under a helmet's rim, let alone if the wedging in of a bracket could deform or damage the helmet's impact absorbing material. Additionally, Burse is not intended to provide a quick attachment/detachment from the helmet.

U.S. Pat. No. 8,156,575 to Tronvig references an integrated single mirror system that incorporates a recess capability whereby the arm and mirror can be folded into the helmet assembly when not in use.

In U.S. Patent Application 20070091480 to Varnes, a mirror assembly can be attached to either the forks, handlebars, or frame of the bicycle. The device in Varnes provides forward viewing from a single low aerodynamic rider position, that results in the rider looking directly down to the ground and not forward at oncoming traffic. While in that single position the view in the mirror allows the rider to see oncoming vehicles. Alternatively, the second mirror can be used to view traditional rear approaching objects in the same single low aerodynamic rider position. Viewing from other body positions on the bike, such as an upright seated or standing position, would require further adjustment of the rear facing mirror in order for the rider to view rear approaching vehicles. Such adjustments of a mirror made during an actual ride are dangerous as the rider's attention to what is in front of them is greatly reduced. Additionally, such adjustments made during a ride can negatively affect the rider's coordination while steering the bike—this occurs as the rider will tend to steer a bike in the direction their eyes are looking. Another concern with this device is that a rider is encouraged to not look directly ahead of them to see oncoming traffic, rather they are directly looking towards the ground and using a mirror to see in front of them. This would offer a restricted view of forward approaching vehicles and or road obstacles.

SUMMARY

In the present disclosure, a device and method of use for a bicycle rear-view mirror is provided that alleviates the need to make mirror adjustments when a cyclist changes their body position while riding.

Thus by one broad aspect of the present invention, a bicycle mirror device is provided, the device including a first and second mounting arm, each mounting arm attached to a helmet or eye glasses, and a first and second mirror, each mirror pivotally mounted to the corresponding first and second mounting arms, for providing a plurality of rear-view angles.

By a further aspect of the present invention, a method is provided for presenting a plurality of viewing angles to the rear of a cyclist, the method including mounting a mirror device on a helmet or eye glasses, the mirror device comprising a first and second mirror each rotatably attached to a corresponding first and second mounting arm, rotating the first mirror to view a first rear-view angle for the cyclist in a low riding position, rotating the second mirror to view a second rear-view angle for the cyclist in an upright riding position, and viewing a plurality of rear view angles without readjusting the first or second mirror.

A further understanding of the functional and advantageous aspects of the invention can be realized by reference to the following detailed description and drawings.

BRIEF DESCRIPTION OF THE DRAWINGS

Embodiments disclosed herein will be more fully understood from the following detailed description taken in connection with the accompanying drawings, which form a part of this application, and in which.

DETAILED DESCRIPTION

The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although the invention has been described with a preferred embodiment, it should be noted that the inventor can make various modifications, additions and alterations to the invention without departing from the original scope as described in the present disclosure.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

The present invention is an improvement on the prior art, as the present invention not only allows the rider to view rear oncoming objects from multiple rider positions on the bike without having to make mirror adjustments, but can also be quickly and securely attached or removed from an existing protective helmet without potentially damaging the helmet or needing to reapply any further adhesives, which is only applied once to the mounting base in the case of the proposed invention.

Figure 1:
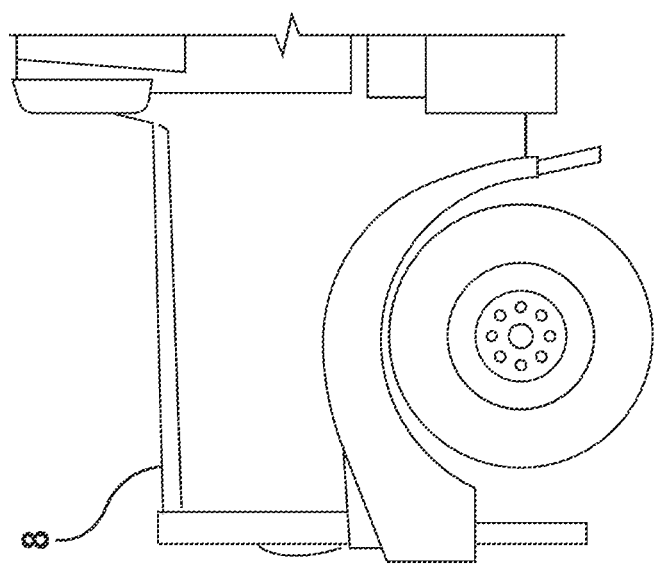
FIG. 1 illustrates a side perspective view of different body angle positions of a cyclist illustrating an embodiment of the present disclosure.
Figure 1:
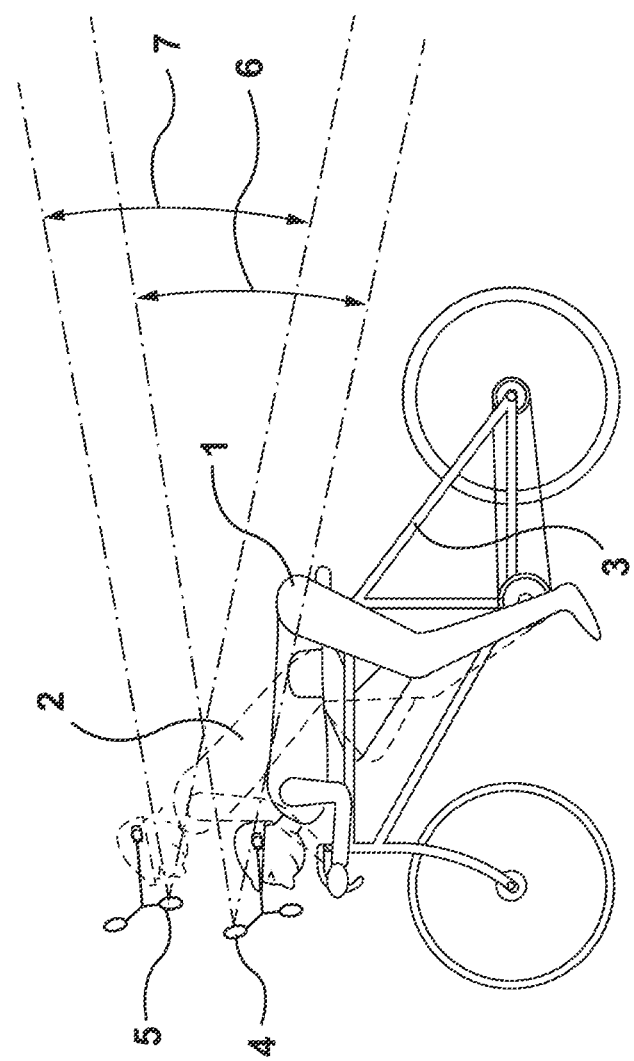

Referring to FIG. 1, there is shown a perspective view of a preferred embodiment of a rider 1, 2 on a standard two-wheel bicycle 3 with the rider being in a low aerodynamic profile 1 and utilizing the top mirror 4 to view rear approaching vehicles in the visual range 6. With a rider in the high standing profile 2 and utilizing the bottom mirror 5, the rider is able to view rear approaching vehicles 8 in the visual range 7.

Figure 2:
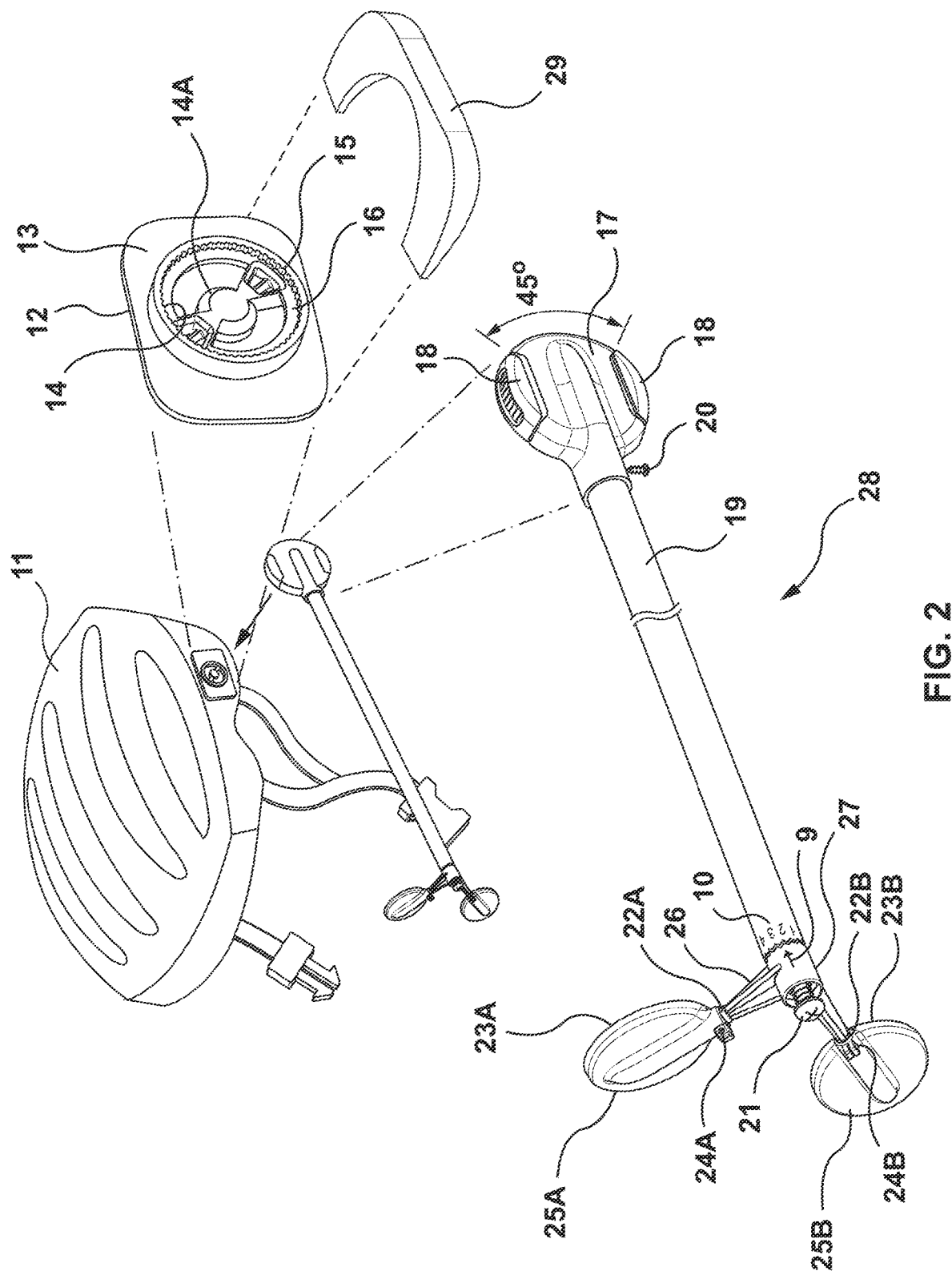
FIG. 2 illustrates a side and exploded view of an embodiment of the present disclosure.

Referring to FIG. 2, there is shown a perspective view of a rider's helmet 11 of the embodiment provided in FIG. 1. A male adaptor side helmet mounting bracket 13 may be attached with a commercial grade double sided adhesive tape 12. The mounting bracket 13 contains the outer gear section 14 for mating to outer extension arm rotational gear bracket section 17, inner ring cavity 16 surrounds center mounting section 15. Outer extension arm bracket 17 snaps onto male side helmet mounting bracket 13 by squeezing plastic ring portion 18 which has a natural tendency to return to its original shape once the rider releases squeeze pressure. The bracket section 17 can be rotated through a range of 45 degrees when connected onto male side helmet mounting bracket 13. The bracket section 17, using an interlocking gear tooth arrangement, provides the rider with virtually no outward movement or vibration of the attached plurality of mirrors 4, 5, thus providing a more stable rear viewing compared to standard bicycle mirror configurations. Additionally, this novel adaptation allows the rider 1, 2 to quickly change the vertical angle aspect of the mirror extension arm 19 which can be beneficial to riders of different heights. This also provides the ability to quickly detach the mirror assembly as so to avoid potential damage to the mirror assembly when the helmet 11 is not being worn by the rider.

The helmet mounting bracket 13 is mounted in a near parallel position on the side of the helmet 1. As some helmet designs might not provide a sufficiently flat mounting surface, it may be required to utilize a wedge 29 secured using double sided tape and placed between the helmet mounting bracket 13 and against the helmet 11 to bring the helmet mounting bracket 13 into its proper position. Additionally, with helmets having numerous venting holes, it may be advantageous to also utilize the helmet mounting bracket's 13 built in eye lets 14A, which can accommodate tie wrap straps to help ensure secure mounting to the helmet 11.

Extension arm 19 is threaded, allowing it to provide adjustable length within the entire bracket assembly 28 and is tightened into place by locking screw 20. Distal end of extension arm 19 contains the mirror assembly arm 26 for the upper mirror reflective surface 23A and, the mirror assembly arm 27 for the lower mirror reflective surface 23B which are affixed to extension arm 19 with screw 21. Ball joints 22A and 22B allow rotational movement of each mirror body 25A and 25B. Screws 24A and 24B tighten their respective mirror body 25A and 25B into place once the rider has found the best viewing positions. The opposite side of each mirror body 25A and 25B contains a light reflective surface that will allow oncoming vehicle drivers to better see the bicycle rider.

Figure 3:
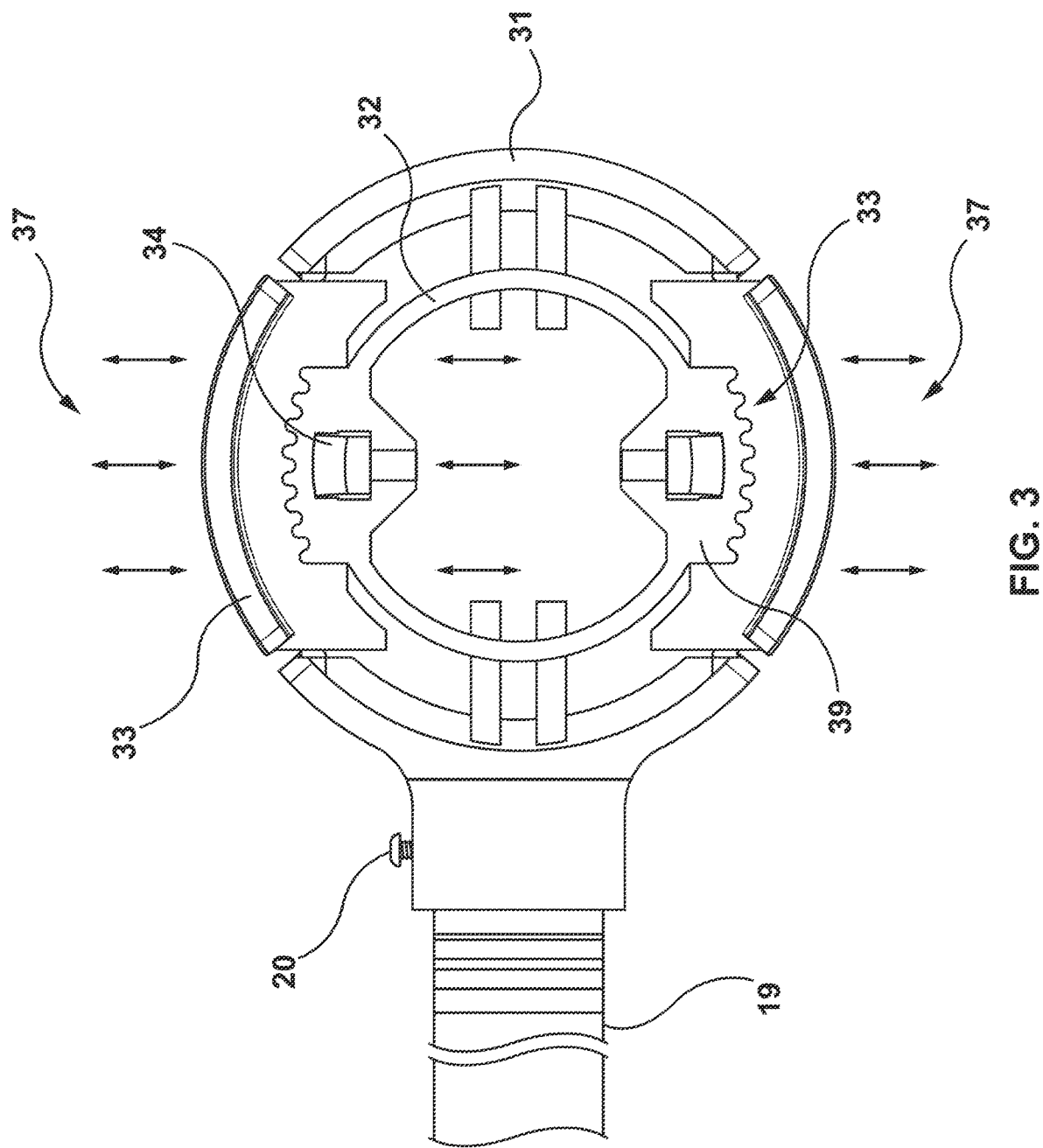
FIG. 3 illustrates a perspective bottom view of an embodiment of the present disclosure.

Referring now to FIG. 3, there is shown a perspective view of the outer extension arm rotational gear bracket section 17 of the opposite side to FIG. 2. Specifically, 31 represents the opposite side with the plastic squeeze ring 32 moving inwards as external pressure 37 is gently applied typically with the rider's thumb and fore finger against the opposing sides of the squeeze ring. Once positioned, the rider will release said squeeze pressure 37, thus setting the bracket 28 in place on the helmet 11. The mating gear section 33 mates against the gear teeth 14. The internal bracket guide 34 moves within the inner ring cavity of 16. The extension arm 19 and locking screw 20 are also shown, in reverse view as provided in FIG. 2.

The two adjustable mirror bodies 25A, 25B are mounted on the mirror assembly arms 26, 27 and are specifically adjusted in angle and length for the rider. The assembly arms 26, 27 are further attached via, for example, a ratchet connection to extension arm 19 thus providing an additional rotational adjustment. The multiple angle, length and rotational adjustments together permit the rider to set the mirror bodies 25A, 25B in a configuration to view rear traffic in a variety of positions while on the bike, thus avoiding dangerous adjustment of mirrors while riding. For example, sitting in an upright seated position or even fully standing in the pedals as when climbing a hill, the rider would view rear approaching vehicles in mirror surface 23B mounted on mounting arm 27, while when seated in a low aerodynamic position using traditional bull horn handlebars or aero bars, the rider would view rear approaching vehicles in mirror surface 23A mounted on mounting arm 26. It is important to note that using traditional bike mirrors, the aforementioned viewing ranges are not possible to achieve unless the rider attempts to make adjustments to the mirror while riding, which is a very dangerous thing to do while riding.

The helmet mirror assembly 28 is designed to simply snap in place onto a previously secured mounting base 13, allowing for quick removal of the mirror assembly and thus preventing accidental damage when not in use. Once in place, the helmet mirror assembly 28 is secure on its mounting base on the helmet 11, such that there is negligible vibration carried through to the mirror assembly. This is in contrast with many commercially available bicycle mirrors that simply use a Velcro connection, which results in vibration issues at the mount and thus negatively affect a traditional mirror's viewing surface.

The present invention has been shown and described in a preferred embodiment. It is recognized, however, that departures may be made within the scope of the invention and that obvious modifications will occur to a person skilled in the art. With respect to the above description, it is to be realized that the optimum dimensional relationships for the parts of the presented invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the present invention. Further, since numerous modifications and changes will readily occur to those skilled in the art, it is not desired to limit the present invention to the exact construction and operation shown and described, and accordingly, all suitable modifications and equivalents result to falling within the scope of the invention.

What is claimed is:

1. A bicycle mirror device, the device comprising:
   first and second mounting arms adapted to be attached to a helmet or eye glasses through an extension arm and a quick-connect mounting mechanism;
   first and second mirrors, each mirror pivotally mounted to the corresponding first and second mounting arm, for providing a plurality of rear-view angles;
   wherein the quick-connect mounting mechanism comprises:
   a mating gear section; and
   a mating teeth section for interacting with the mating gear section;
   the mating gear section and mating teeth section being rotatable with each other, thereby allowing the extension arm to rotate with respect to the helmet or eye glasses.

2. The device of claim 1, further wherein:
   the first and second mounting arms are rotatably attached to the extension arm.

3. The device of claim 1, wherein the first and second mirrors are convex, flat, or concave.

4. The device of claim 1, further wherein the quick-connect mounting mechanism prevents vibration of the extension arm, for maintaining a clear view in the first and second mirrors.

5. The device of claim 1, wherein:
   the first and second mirrors further comprise a position locking pin and a marking system, for marking a rider-preferred mirror positioning.

6. The device of claim 1, wherein the first and second mirrors comprise anti-glare, impact resistant glass and the mounting arms comprise high-impact resistant ABS plastic.

7. The device of claim 1, wherein the first and second mirrors comprise a reflective surface on the back of the first and second mirrors, for detection by oncoming traffic.

8. A method for presenting a plurality of rear-viewing angles to a cyclist, the method comprising:
   providing first and second mounting arms adapted to be attached to a helmet or eye glasses of the cyclist through an extension arm and a quick-connect mounting mechanism;
   providing first and second mirrors, each mirror pivotally mounted to the corresponding first and second mounting arm, for providing a plurality of rear-view angles;
   wherein the quick-connect mounting mechanism comprises:
   a mating gear section; and
   a mating teeth section for interacting with the mating gear section;
   the mating gear section and mating teeth section being rotatable with each other, thereby allowing the extension arm to rotate with respect to the helmet or eye glasses;
   adjusting the first mirror to view a first rear-view angle for the cyclist in a low riding position;
   adjusting the second mirror to view a second rear-view angle for the cyclist in an upright riding position;
   wherein a plurality of rear-view angles are presented without readjusting the first or second mirror.

\* \* \* \* \*